United States Patent [19]

Yoshii et al.

[11] Patent Number: 5,802,536
[45] Date of Patent: Sep. 1, 1998

[54] INFORMATION SEARCH AND DISPLAY APPARATUS

[75] Inventors: Fumihiko Yoshii, Tokyo; Koichi Hayasaka, Kanagawa, both of Japan

[73] Assignee: Sony Corporation, Tokyo, Japan

[21] Appl. No.: 949,533

[22] Filed: Oct. 14, 1997

Related U.S. Application Data

[63] Continuation of Ser. No. 618,080, Mar. 18, 1996, abandoned, which is a continuation of Ser. No. 66,765, May 25, 1993, abandoned.

[30] Foreign Application Priority Data

May 29, 1992 [JP] Japan .................... 4-163834

[51] Int. Cl.⁶ ...................................... G06F 17/30
[52] U.S. Cl. ................. 707/532; 345/340; 704/8; 707/4; 707/5; 707/535; 707/536
[58] Field of Search ................ 705/1, 4, 7; 707/1, 707/2, 3, 4, 5, 10, 104, 500, 526, 530, 531, 532, 533, 536; 345/326, 340, 346; 704/2, 3, 7, 8, 10

[56] References Cited

U.S. PATENT DOCUMENTS

| | | | |
|---|---|---|---|
| 4,777,600 | 10/1988 | Saito et al. | 364/419.02 |
| 5,123,103 | 6/1992 | Ohtaki et al. | 395/500 |
| 5,136,504 | 8/1992 | Fushimoto | 364/419.02 |
| 5,157,783 | 10/1992 | Anderson et al. | 395/600 |
| 5,168,533 | 12/1992 | Kato et al. | 382/54 |
| 5,202,828 | 4/1993 | Vertelney et al. | 364/419.13 |
| 5,220,625 | 6/1993 | Hatakeyama et al. | 382/54 |
| 5,265,065 | 11/1993 | Turtle | 395/600 |
| 5,278,980 | 1/1994 | Pedersen et al. | 395/600 |
| 5,287,501 | 2/1994 | Lomet | 395/600 |
| 5,297,039 | 3/1994 | Kanaegami et al. | 364/419.13 |

FOREIGN PATENT DOCUMENTS

| | | | |
|---|---|---|---|
| A-0431-590 | 6/1991 | European Pat. Off. | G11B 27/10 |
| 0437-091 | 7/1991 | European Pat. Off. | G11B 25/04 |
| A-0436-964 | 7/1991 | European Pat. Off. | G11B 19/02 |
| A-0437-093 | 7/1991 | European Pat. Off. | G06F 15/40 |

OTHER PUBLICATIONS

Linzmayer; "Language Master"; *MacUser;* v6 n1; p. 92(3); Jan., 1990; Dialog: File 275, Acc# 01344016.

*Primary Examiner*—Stephen R. Tkacs
*Attorney, Agent, or Firm*—Limbach & Limbach L.L.P.

[57] ABSTRACT

An information search and display apparatus substantially reduces search time required in consecutively searching a plurality of files and/or a plurality of search terms. When a first search result searched based on a search term entered by a signal input means is displayed and a second search is executed to obtain a second search result following the first search, upon termination of the second search, the state of displaying the search result of the first search is restored.

10 Claims, 7 Drawing Sheets

INFORMATION SEARCH AND DISPLAY APPARATUS

This is a continuation of application Ser. No. 08/618,080 filed on Mar. 18, 1996, now abandoned, which is a File Wrapper Continuation of application Ser. No. 08/066,765 filed on May 25, 1993, now abandoned.

BACKGROUND OF THE INVENTION

This invention relates to an information search and display apparatus, and more particularly to an improvement of the information search and display apparatus for searching information recorded in a disc type recording medium.

DESCRIPTION OF THE RELATED ART

Conventionally, a portable type data disc reproducing apparatus has been proposed, in which a huge amount of character information and image information contained in a word book, an English-Japanese dictionary and so forth is stored as digital data in an optical disc read-only memory (hereinafter referred to as CD-ROM) and data corresponding to key words entered by the user is searched from the huge amount of data in a short time period, and displayed on a liquid crystal display.

Further, some of this type of reproducing apparatus have been proposed such that the pronunciation of the wise sayings of famous persons and words displayed on the liquid crystal display may also be heard as a voice through a built-in speaker.

In this type of reproducing apparatus, search of information for such as Japanese language is generally performed using phonetic characters, since memory capacity for storing ideographic symbols of search information becomes large if information is searched using ideographic symbols (i.e., if the search is done directly using "kanji" characters entered by the user). It is noted that the Japanese language includes "Kanji" characters, i.e., the Chinese characters which are the ideographic symbols, and "Hiragana" characters, the Japanese cursive syllables, which are the phonetic characters. Therefore, when a search of information is desired, the key words to be searched must be entered at each time by the user using phonetic characters.

Also, if a plurality of files are stored in one CD-ROM, only one file can be searched at a time. if it is desired to search information in another file which is different from the current search file, the new file must be searched from an initial state after closing the current search file.

Figure 7A:
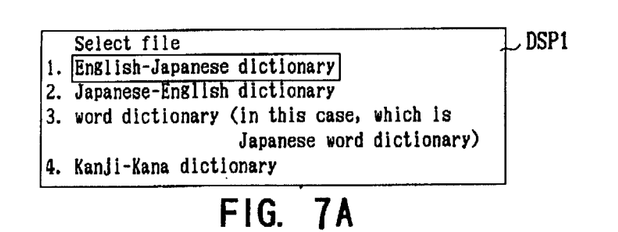
FIGS. 7A through 7G are schematic views showing display screens of a multiple item search.
Figure 7B:
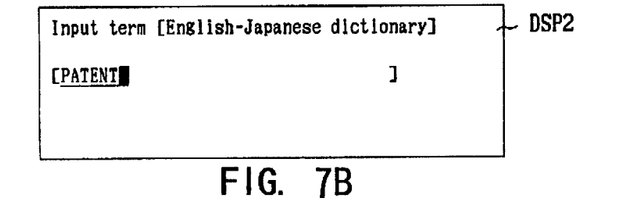
Figure 7C:
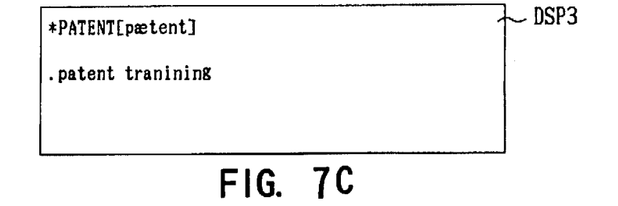
Figure 7D:
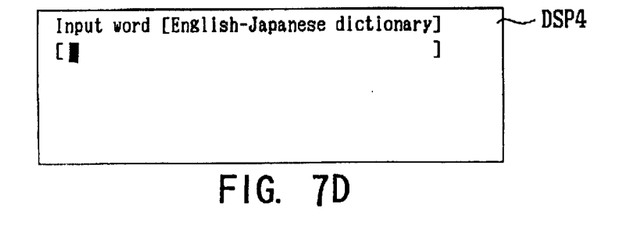

For example, it will be supposed that, while studying the Japanese equivalent of the word "PATENT" by using an English-Japanese dictionary as the search file, it becomes necessary to look up in a Japanese word dictionary the definition of the term "patent" (this term is written with Kanji characters in FIG. 7C). In this case, the search of the English-Japanese dictionary has to be terminated to return to the initial screen. The term "patent" (written in Kanji characters) is then searched using the Japanese word dictionary as the search file. After such search, if one desires to return the state of displaying "PATENT" in the English-Japanese dictionary, the English-Japanese dictionary must be selected all over again in the initial screen to restore the screen of "PATENT" which has been terminated. There thus has been a problem that much labor and a tiresome operation are required.

Likewise, even while searching one of the files, if there is other information to be searched within the current search file, the current search must be terminated to return to the initial screen, and the new information has to then be searched. At this point even if it is desired to search back to the preceding information, the original information must be searched all over again from the initial screen.

SUMMARY OF THE INVENTION

In view of the foregoing, an object of this invention is to provide an information search and display apparatus in which search time required in search of a plurality of documents is greatly reduced and a plurality of information in one or more files may be simultaneously searched while comparing one with another for reference.

The foregoing object and other objects of the invention have been achieved by the provision of an information search and display apparatus, comprising: an information reproducing means; a key signal input means; a display means; and a control means, wherein the control means searches, reads out and displays on the display means display data of the information reproducing means on the basis of a key signal to be entered from the key signal input means. It is adapted such that, if a command for a new search is requested by means of operation of the key signal input means in the state where a first search result searched by the key signal from the key signal input means is displayed, a second search is executed; a second search result is displayed on the display means; and, upon termination of the second search, the system returns to the state where the search result of the first search is displayed.

It is adapted such that if the key signal input means is operated in the state where the first search result searched by the key signal using the key signal input means is displayed, the second search is executed; and, if the second search is terminated after displaying the search result of the second search, the system returns to the state where the search result of the first search is displayed, thereby action for returning to the initial screen at each time may be eliminated when a plurality of files and items are to be successively searched, so that reduction in search time and improvement in search efficiency may be achieved.

Further, a portion of the displayed data of the first search result may be selected as the search word in the second search by operation of the key signal input means, thereby reducing the time and labor needed for entering the search word in the second search.

As has been described, according to the present invention, in the state where a first search result searched by a key signal input using a key signal input unit is displayed, if a second search is requested by an operation of the key signal input unit, the second search is executed to display the result on the display unit and, upon termination of the second search, the state of displaying the search result of the first search can be restored. Thereby, an operation as in the conventional apparatus, wherein the current search operation must be terminated before the next search operation can be started may be made unnecessary, thus greatly reducing the search time required in executing a plurality of searches.

The nature, principle and utility of the invention will become more apparent from the following detailed description when read in conjunction with the accompanying drawings in which like parts are designated by like reference numerals or characters.

DETAILED DESCRIPTION OF THE PREFERRED EMBODIMENT

Preferred embodiments of this invention will be described with reference to the accompanying drawings.

(1) General Construction of the Embodiment

Figure 1:
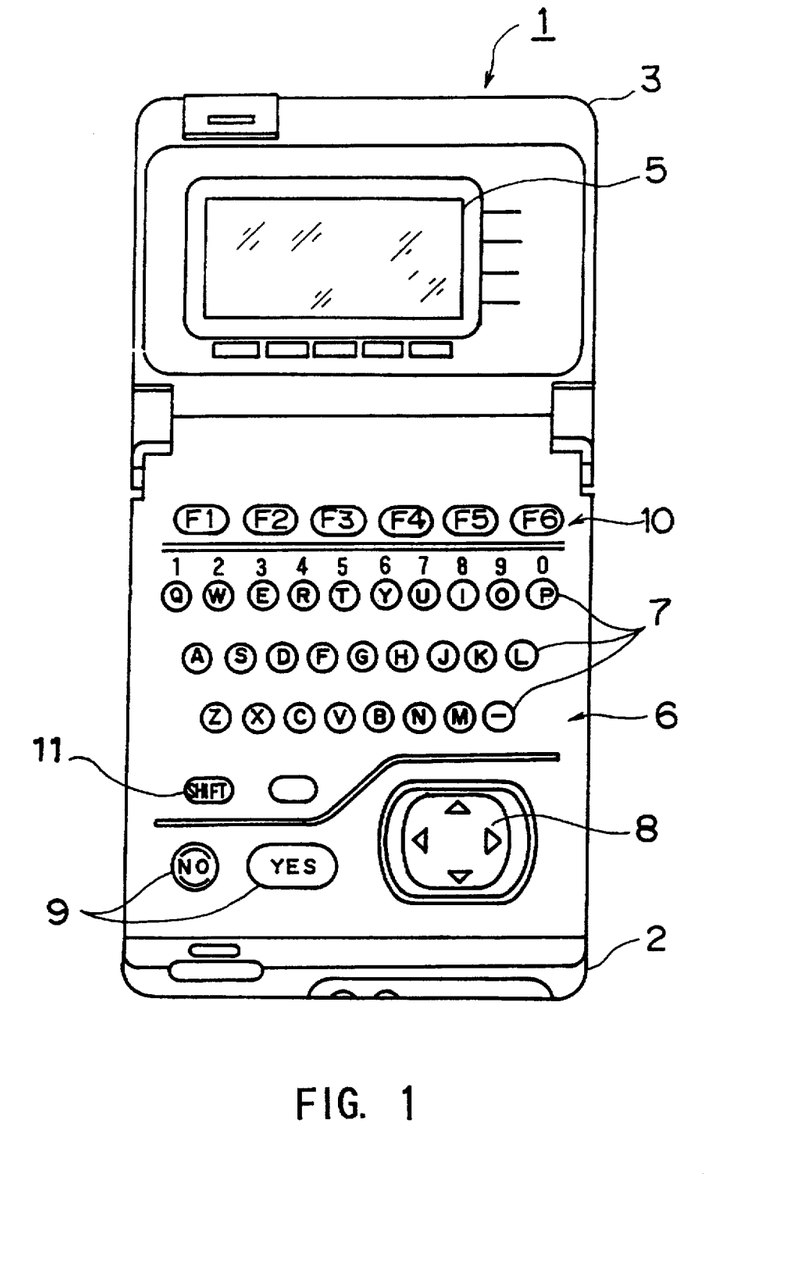
FIG. 1 is a schematic plane view showing an embodiment of the data reproducing apparatus according to present invention.
Figure 2:
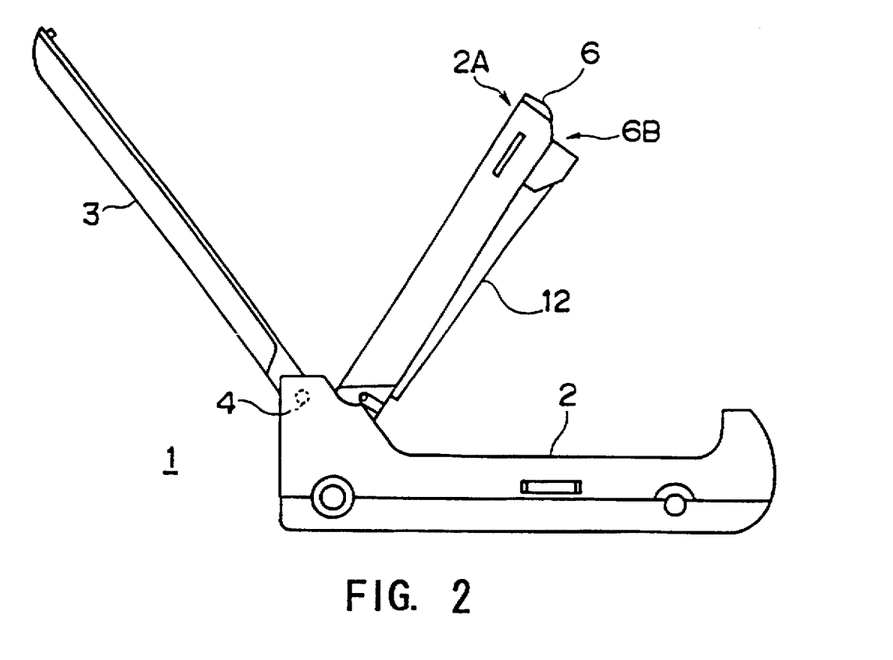
FIG. 2 is a schematic side view showing an embodiment of the data reproducing apparatus according to the present invention.

In FIGS. 1 and 2, a reference numeral 1 is generally denoted a disc reproducing apparatus, where the disc reproducing apparatus 1 is constituted by a main body 2 containing a data processing circuit system, and a lid 3.

Here, the lid 3 is supported on the main body 2 in a manner rotatable about a support shaft 4 and, when not used (i.e., the lid is closed), it covers an upper surface 2A of the main body 2 to form a rectangular shape as a whole so that the resulting shape becomes smaller and is convenient for carrying.

Further, a liquid crystal display 5 for displaying information, for example, character information read from CD-ROM (Compact Disc-Read Only Memory), is provided on the inward surface of the lid 3. When the disc reproducing apparatus 1 is used, the lid 3 is adapted such that it may be retained at a rotated position where the display screen of the liquid crystal display 5 is easily seen.

On the other hand, the main body 2 is adapted so that a disc cartridge enclosing a CD-ROM recording of data files as a dictionary or an encyclopedia may be installed thereon, and a key mount 6 having various keys arranged thereon is rotatably supported by a rotation shaft on the upper surface of the main body 2.

For example, arranged on the upper surface 2A of the main body 2 are: alpha-numeric keys 7, a cursor movement key 8, selection keys 9 for selecting selection items, function keys 10 for selecting various processing modes, and a shift key 11.

Further, supported on the main body 2 at the back reverse surface side 6B which is opposite to the upper surface 2A having various keys of the key mount 6 arranged thereon is a cartridge holder 12 into and from which a disc cartridge enclosing a CD-ROM can be inserted and removed. It is adapted to be rotated following the rotation of the key mount 6 (FIG. 2).

(2) Construction of Main Body 2

Figure 3:
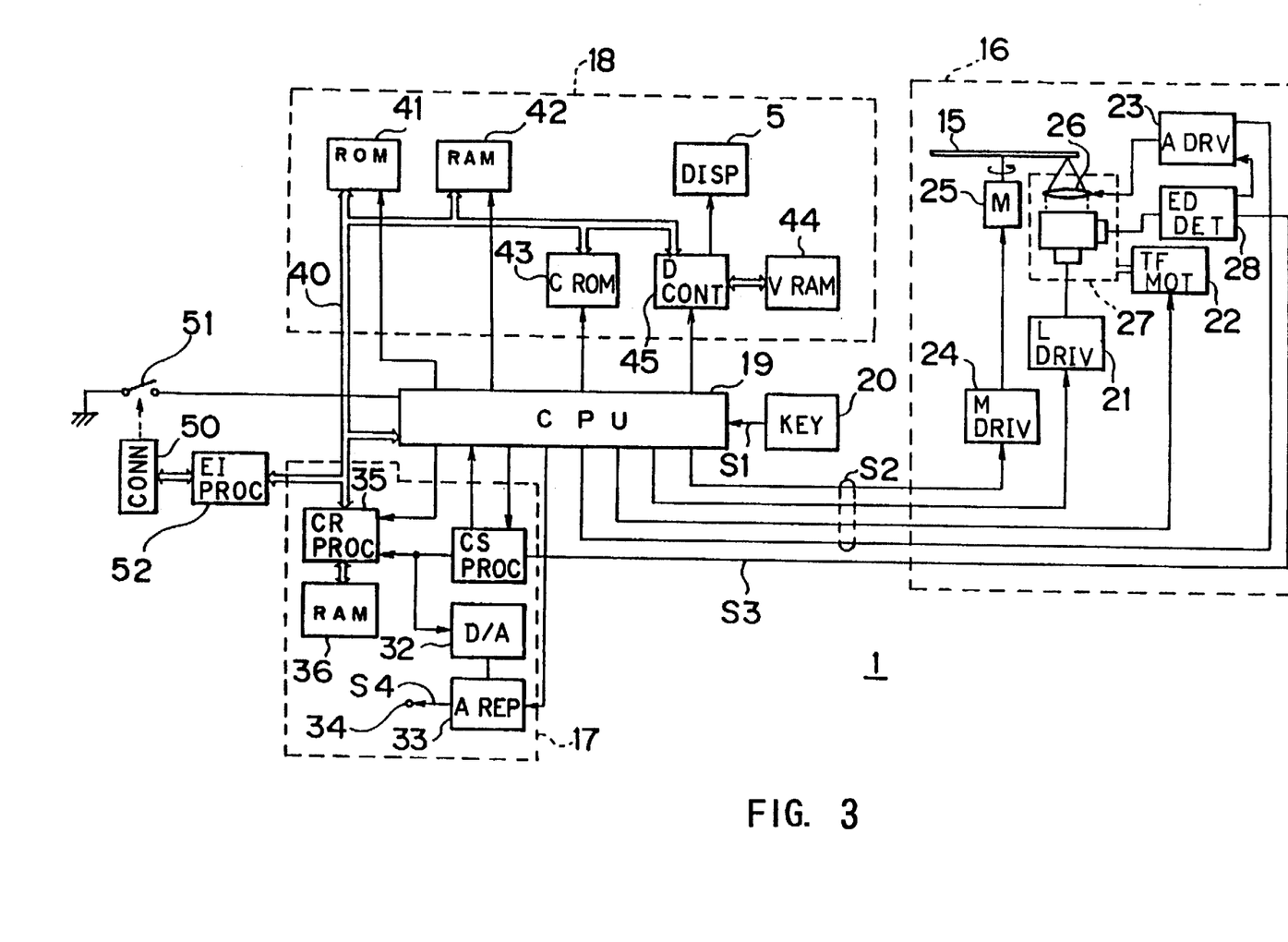
FIG. 3 is a block diagram explaining the construction such apparatus as a whole.

As shown in FIG. 3, the main body 2 is constituted by: a reproducing block 16 including a disc drive for reproducing a recorded data from data disc (i.e., CD-ROM) 15 enclosed in the disc cartridge, an audio signal processing block 17 for processing mainly an audio signal of read out data, a data processing block 18 comprising a display for executing a search of the read out data to display it on the screen, and a CPU (Central Processing Unit) 19 for controlling those blocks.

Here, when an input signal S1 is entered from the keyboard 20, the CPU 19 delivers a control signal S2 to: a laser beam source driving unit 21, a thread feed motor 22, a biaxial actuator driving circuit 23, and a motor driving circuit 24, respectively of those in the reproducing block, so as to control the reproducing block 16 by the control signal S2.

Specifically, the CPU 19 is adapted to rotate a spindle motor 25 at a constant linear velocity (CLV) or at a constant angular velocity (CAV) by controlling the motor driving circuit 24. It is also adapted to move a pickup 27 consisting for example of an objective lens 26, a photo detector and an optical element for detecting focus errors attached on the biaxial actuator to certain tracks (so-called diametrical control of the pickup) by controlling the thread feed motor 22.

The CPU 19 is also adapted to move the objective lens 26 of the pickup 27 up and down by controlling the biaxial actuator driving circuit 23 to adjust focusing and to cause a beam spot irradiated on a desired track by turning the objective lens 26 (so-called tracking control) left and right so as to reproduce data stored in the data disc 15.

When a data signal is read out from the data disc 15, an error-detecting/data-detecting circuit 28 is to detect a focus error and/or a tracking error, for example, by obtaining what is called as sum and difference and it drives the objective lens 26 by supplying the focus error and/or the tracking error to the biaxial actuator driving circuit 23 to keep focusing and tracking at a normal state, so as to read out the data accurately.

In this connection, the laser beam irradiated onto the data disc 15 is controlled by supplying to the laser beam source driving circuit 21 a detecting signal detected from the laser beam which is output, for example, from a laser diode (not shown). The power of the laser beam is kept constant at all times during reproduction.

Further, a sub-code area and a data area are provided, for example, for each one frame on the data disc 15, such that a synchronizing signal, position information and time information are written in the sub-code area and character information is written in the data area.

On the other hand, the reproducing signal containing the synchronizing signal and time information reproduced from the data disc 15 is supplied to a CD (Compact Disc) signal processing circuit 31 of the audio signal processing block 17 by way of the error-detecting/data-detecting circuit 28.

Here, the CPU 19 detects whether the data disc 15 mounted on the main body 2 is a so-called audio CD for storing audio data or a so-called CD-ROM disc for recording character information, for example, a dictionary or an encyclopedia, and supplies the detecting signal to the CD signal processing circuit 31.

At this time, the CD signal processing circuit 31 separates the reproducing signal S3 supplied from the reproducing block 16 into a sub-data signal consisting of a synchronizing signal, time information and a main data signal, and, if the main data signal is an audio data, the audio data signal is supplied to a digital to analog converting circuit (D/A) 32.

In the case of this embodiment, the audio data signal supplied to the digital to analog converting circuit 32 is converted into an analog signal and is supplied to an audio reproducing circuit 33 to derive an audio signal S4 to an output terminal 34.

On the other hand, if the main data supplied to the CD signal processing circuit 31 is character data or image data or the like, the CD signal processing circuit 31 supplies such data signal to a CD-ROM signal processing circuit 35.

At this time, the CD-ROM signal processing circuit 35 is adapted to read the supplied character data signal or the image data signal in accordance with a signal supplied from the CPU 19 through a RAM (Random Access Memory) 36 for temporary storage.

In the case of this embodiment, the ROM (Read Only Memory) 41 stores the search program or the like and a RAM 42 is connected to a data bus 40, the read out character data signal or the like being transmitted thereto through the data bus 40.

Figure 4:
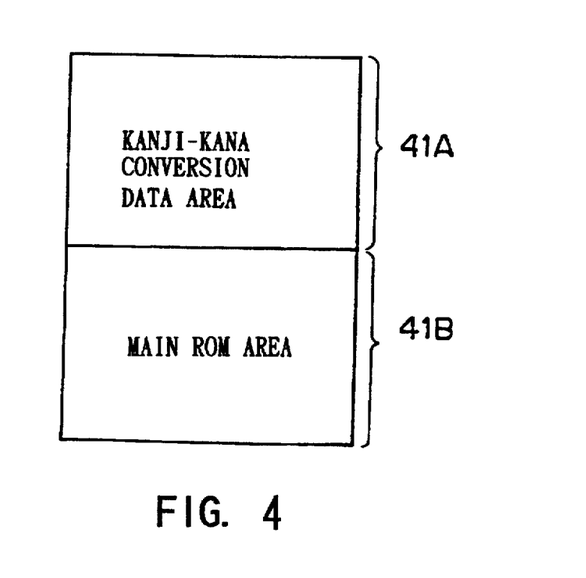
FIG. 4 is a memory map explaining contents of a read only memory.

In this connection, the ROM 41 is formed as shown in FIG. 4 of two areas, a "Kanji-Kana" conversion data area 41A and a main ROM area 41B.

Here, when a character pattern or the like is read out from a character ROM 43 in accordance with a character data signal, the data processing block 18 stores a display image within a video RAM 44 and is adapted to read the display image from the video RAM 44 by control of a display controller 45 on the basis of the control signal input from the CPU 19 to display it on the liquid crystal display 5 provided on the lid 3.

A connector 50 for interface is provided on the main body 2 so that, when an external connecting terminal is connected to the connector 50, a switch 51 is turned on to reset the CPU 19 at the same time of such connection, whereby a command to be entered through the interface is processed at an external interface processing circuit 52 and the processed data is displayed on the liquid crystal display 5 through the data bus 40.

(3) Search Processing of Multiple Files and Multiple Items

The CPU 19 is adapted so that, while keeping a search state of the search file or search item currently searched, it can execute a search of another file or item and display the two search results simultaneously on the liquid crystal display 5 based on the procedure shown in FIGS. 5, 6 and 7A to 7G.

Specifically, starting a search from step SP1, the CPU 19 proceeds to step SP2 to read the file data including a plurality of file names from the data disc 15 to display it on the screen, and requests the user to select one of the file names with an image DSP1 as follows (FIG. 7A):

DSP1

Select file
1. Enlish-Japanese dictionary
2. Japanese-English dictionary
3. word dictionary (in this case, a Japanese word dictionary)
4. Kanji-Kana dictionary

When the user selects one of the file names, such as "English-Japanese dictionary", the operation of the CPU 19 proceeds to step SP3 to memorize the selected file name. Next, the operation of the CPU 19 proceeds to step SP4 to become a mode of entering a search condition, such as a search term with an image DSP2 as follows (FIG. 7B):

When the user enters a search term such as "PATENT" written in English, the operation of the CPU 19 proceeds to step SP5 to memorize the search term entered by the user. The information memorized at steps SP3 and SP5 are actually stored into the RAM 42. Next, the CPU 19 executes the search at step SP6, and displays the result at step SP7 on the liquid crystal display 5 with an image DSP3 as follows (FIG. 7C).

Here, the CPU 19 checks whether or not a request for a further new search is entered by the user at step SP8. If the new search request is entered, the CPU 19 proceeds to step SP9 and examines whether the search request is for the same file or a different file. When the search request is for a different file, the CPU 19 proceeds to step SP10 to generate a window (W) as a new image hierarchically overlapped on the preceding image. On the new window (W), file data including a plurality of file names are displayed so as to request the user to select one of the file names with an image DSP6 as follows (FIG. 7E):

When the user selects one of the file names, the operation of the CPU 19 proceeds to step SP12 to request the user to enter a search term with an image DSP8 as follows (FIG. 7F):

Here, when the user enters the search term, the CPU 19 proceeds to step SP13 to execute the search, and the search result data is displayed within the window (W) at step SP14 with an image DSP10 as follows (FIG. 7G):

DSP10

DSP4

Next, the operation of the CPU 19 proceeds to step SP8 to check whether or not a request for a further new search is entered by the user. If the user enters that a further search is not necessary, the operation of the CPU 19 proceeds to step SP15 to examine whether or not there is a window on the liquid crystal display 5. When there is no window, CPU 19 proceeds to step SP2 to become the file selecting mode where the file data are displayed again (FIG. 7A).

If the CPU 19 decides that there is a window at step SP15, the CPU 19 proceeds to step SP16 to read out the data stored in the RAM 42 at the steps SP3 and SP5, the state of the CPU 19 is controlled according to the data read out, and the window is closed at step SP17 to return to the state of displaying searched data (FIG. 7C).

Of course, when a further search is requested at step SP8, the CPU 19 checks again whether the search request entered is to the same file or a different file, and if the user's search request is to a different file, the CPU 19 proceeds to step SP10 again to make a new window on the window generated before.

Also, when the search request is to the same file at the step SP9, the CPU 19 waits for a user's request whether or not the search term is to be selected from the displayed data. If the search term is not selected from the displayed data, the CPU 19 proceeds to step SP19 to generate a new window, and proceeds to step SP12 to wait for an input of the search term by the user.

Figure 8A:
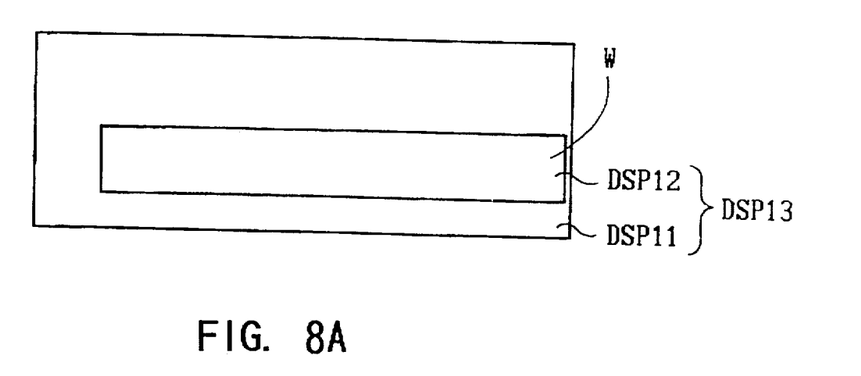
FIGS. 8A and 8B are schematic views showing display screens of a multiple item search.
Figure 8B:
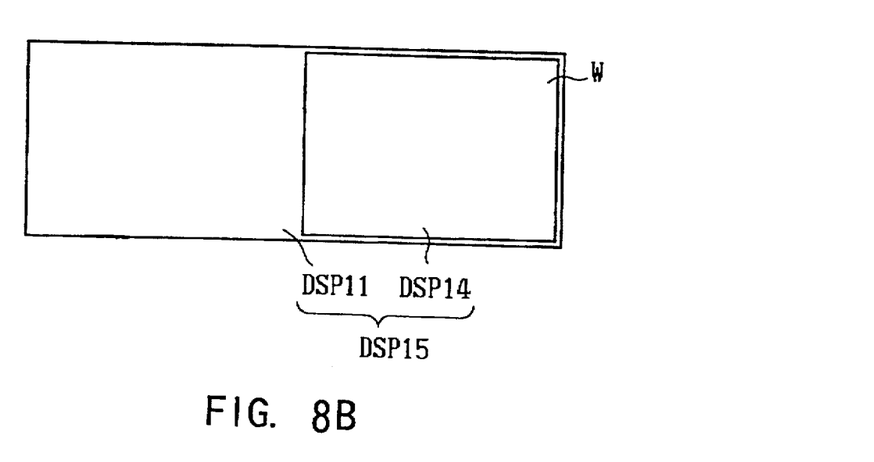

Further, when the user requests that the search term be selected from the displayed data at step SP18, the CPU 19 proceeds to step SP20 to demand the designation of the search term from the displayed data by the user. This operation is performed when the start and end position of the displayed character is designated by means of the cursor key 8. At this time, it is adapted to underline the designated character by the cursor, for example. In this manner, if the search term is determined, the CPU 19 generates a window at step SP21, and simultaneously proceeds to step SP22 to examine whether or not the selected character is an ideographic symbol (in this case, Kanji written in the Japanese language). If it is an ideographic symbol, it is converted into a phonetic character (in this case, Hiragana written in the Japanese language) at step SP23. Of course, if it is a phonetic character at step SP22, step SP23 is skipped (FIG. 8A). Here, if the correction of the selected character is necessary, it is done at step SP25, and the CPU 19 proceeds to step SP26 to execute the search. Next, the operation of the CPU 19 proceeds to step SP27 to close the window once for making a new window for data display at step SP28, then search data is displayed in this window at step SP29 (FIG. 8B). Thereafter, the operation of the CPU 19 proceeds to step SP8 again to wait for a command by the user. Further, if the user wants to enter a new search term at step SP18, the CPU 19 generates a window as large as the liquid crystal display 5 at step SP19, and proceeds to step SP12 and waits for the user's key input with an image DSP4 as follows (FIG. 7D):

After this, the operation of the CPU 19 is repeated as above described.

As above described, since the search data has been stored at steps SP3 and SP5, the second search can be performed in the state where the first search result is displayed. Further, when the second search is terminated, the CPU can be automatically returned in the state where the first search result is displayed.

(4) Operation and Effect of the Embodiment

In the above construction, a data disc 15 storing four files such as an English-Japanese dictionary, a Japanese-English dictionary, a Japanese word dictionary and a Kanji-Kana dictionary, is installed in the cartridge holder 12, and the information search mode is attained by pressing the function keys 10, a file selection screen result as shown in FIG. 7A lists the names of the files.

Here, if the user selects the English-Japanese dictionary, the display results as shown in FIG. 7B, and, when the term "PATENT" is designated, the search data is displayed on the screen as shown in FIG. 7C (steps SP1 through SP7).

Figure 7E:
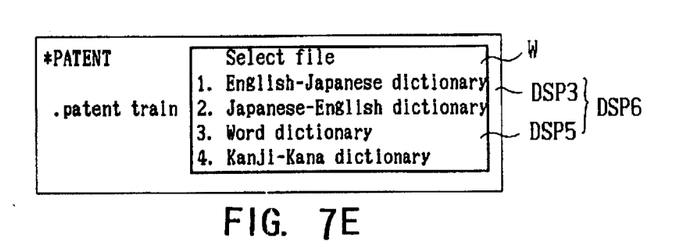
Figure 7F:
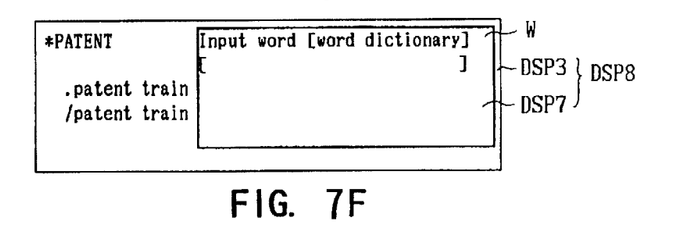

If, in this state, one desires to search the meaning of "PATENT" (written in Kanji), it is necessary in the conventional example to return to the initial screen. But the system in this embodiment proceeds to steps SP8 and SP9 from step SP7 to check whether or not another file is to be searched. If search of another file is selected by the function keys 6, a window is generated as shown in FIG. 7E on the right half of the display screen to display a file selection image.

At this time, when the user moves the cursor to select the word dictionary, a search term input image of the word dictionary is displayed within the window.

Figure 7G:
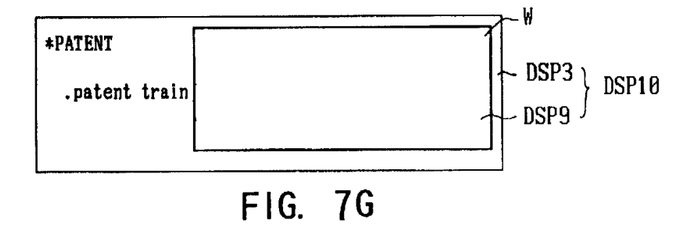

Here, if the user designates "PATENT" (written in Hiragana) as the search term (FIG. 7F), search data of the English-Japanese dictionary and the word dictionary are displayed as shown in FIG. 7G on the display (step SP14).

At this time, when the search of the word dictionary is terminated (i.e., if search of other words in the English-Japanese dictionary is desired), the CPU 19 reads the past search process at step SP16 and then proceeds directly to the search display screen of the English-Japanese dictionary through step SP6, so as to continue search operation.

As the data necessary for search of a CD-ROM or the like is memorized in this manner, it can be returned automatically to the state where the original search data is displayed.

Further, if the current search file is the word dictionary, the CPU 19 decides at steps SP8 and SP9 whether or not the user desires to search another item in the same file while displaying the contents of the current search data and, if a multi item is requested by the function keys F6, the system proceeds to step SP18 to perform the multiple search on the same file (FIGS. 8A and 8B).

At this time, if the user designates "APPLICATION" (written in Kanji) as the search characters by underlining the characters thereof at step SP20, the CPU 19 recognizes that the designated characters are the ideographic symbols and executes Kanji/Kana conversion sequentially through step SP21, step SP22 and step SP23, so as to display "APPLICATION" (written in hiragana) within the window with an image DSP13 as follows (FIG. 8A):

In the image DSP13, bold-faced characters are written in Japanese in FIGS. 8A and 8B, underlined characters are written in Kanji, and the part of "[application]" is written in Hiragana.

In this case, if the conversion into Hiragana has been accurately executed, the CPU 19 executes the search and displays the search result within the window at step SP26 with an image DSP15 as follows (FIG. 8B):

Here, if the user instructs that the window be closed (step SP8), the CPU 19 goes back to the search result display mode for the first search.

According to the above construction, since a multiple file search can be performed: a plurality of files stored in one piece of CD-ROM can be used as an integrated dictionary, dictionaries of several languages and/or various databases can be shared, search time can be greatly reduced, and it is possible to achieve a search while making a comparison with other recorded data.

Further, a multiple search in the same file is made possible and, in such a case, if the designated search character for a further search exists in the displayed image, it is converted into phonetic characters, if necessary. Thereby search time may be greatly reduced.

(5) Other Embodiments

It should be noted that, while in the above described embodiment a description has been given with respect to a case where four files such as the English-Japanese dictionary, the Japanese-English dictionary, the Japanese word dictionary and the Kanji-Kana dictionary are stored in the data disc 15, it is possible to widely apply this to cases where another combination of documents is stored.

Further, while in the above described embodiment a description has been given with respect to a case where the window at the time of a multiple file search and multiple item search is displayed on the right half of the screen, the present invention is not limited to this and it is also possible to display the window at another position for example by dividing the screen into upper and lower halves, or to display the window as large as the entire screen.

Furthermore, while in the above described embodiment, a description has been given with respect to a case where only two hierarchies are displayed, the present invention is not limited to this and it is also possible to use a hierarchical display of three or more hierarchies.

Figure 5:
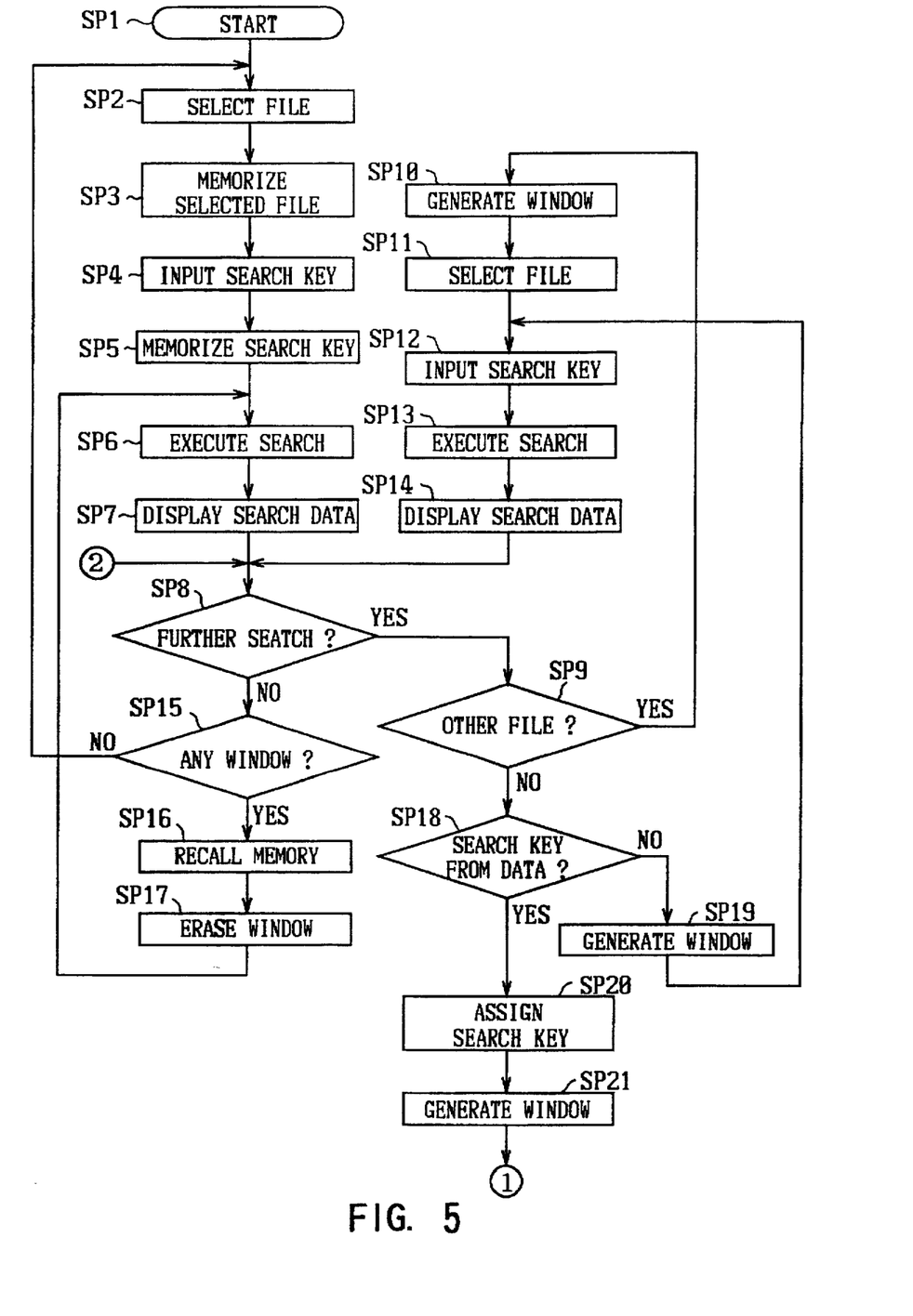
FIG. 5 is flowchart explaining a procedure for searching multiple files and multiple items.
Figure 6:
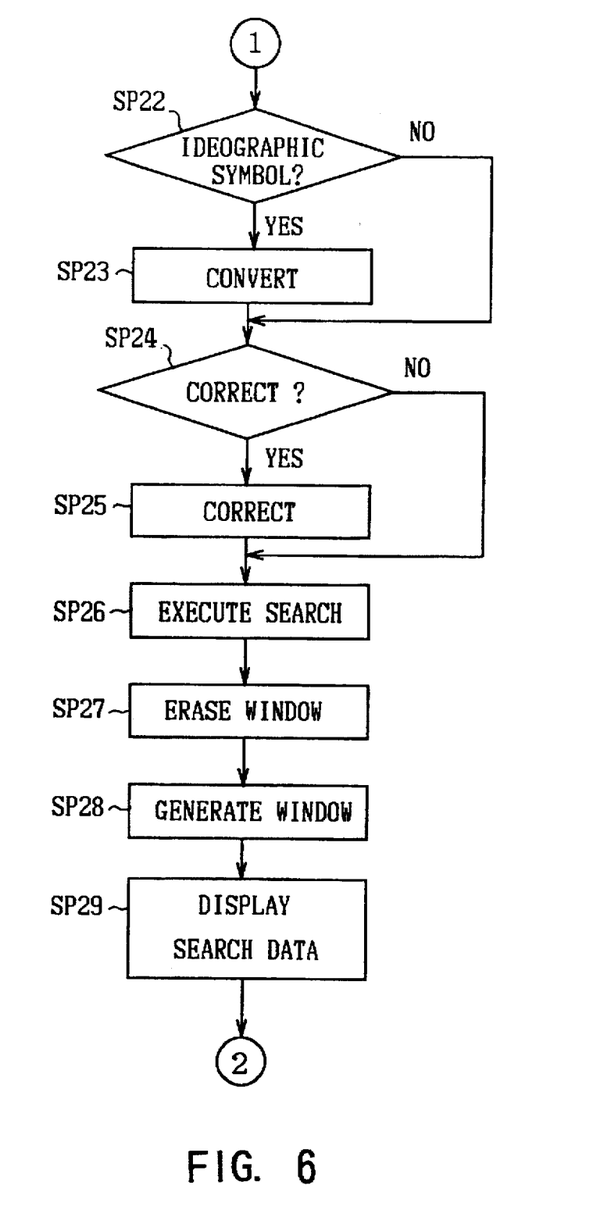
FIG. 6 is a flowchart explaining a procedure for searching multiple files multiple items.

Moreover, while in the above described embodiment a description has been given with respect to a case where a multiple file search and multiple item search are executed in accordance with the flowchart as shown in FIGS. 5 and 6, the present invention is not limited to this and search may be executed based on other procedures.

Further, while in the above described embodiment a description has been given with respect to a case where the search characters are underlined at the time of multiple item search, the present invention is not limited to this and the search characters may be displayed in an inverted manner and application of displaying in a manner of character blinking is widely applicable.

Furthermore, while in the above described embodiment a description has been given with respect to a case where a portion of the displayed data on the screen is designated as the search word, the present invention is not limited to this and key input is also possible.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An electronic dictionary apparatus for use with an optical disc on which is recorded a plurality of dictionary data, the apparatus comprising:

a disc reproducing unit for reproducing the dictionary data recorded on the optical disc;

a controller for determining whether an optical disc loaded in the apparatus is one on which is recorded a plurality of dictionary data and for controlling the operation of the disc reproducing unit;

an input unit for inputting a command signal to the controller, the inputted command signal including a first search term and causing one of the plurality of dictionary data recorded on the optical disc to be selected, searched, and reproduced by the disc reproducing unit;

a memory for storing the first search term representing the first search result; and a display unit for displaying the reproduced data provided by the disc reproducing unit as a first search result;

wherein the controller controls the disc reproducing unit to conduct the first search and reproduce data from the optical disc in response to a first command signal when the controller determines that an optical disc loaded in the apparatus is an optical disc on which is recorded a plurality of dictionary data and controls the display unit to display the data reproduced by the reproducing unit which represents the results of the first search, and further, wherein the controller generates window data for a second search of the dictionary data in response to a second command signal and the reproduced data representing the results of the first search, and causes the display unit to display the window data and a search term for the second search input by using the input unit, the controller than causing the dictionary data to be searched according to the first and second search terms and data representing a result of the second search to be displayed in a window of the display unit, and conducting the first search and reproducing data from the optical disc in response to the second search being terminated.

2. The electronic dictionary apparatus of claim 1, wherein the window including the data representing the result of the second search displayed on the display unit is closed by the controller when the second search is completed.

3. The electronic dictionary apparatus of claim 1, wherein the apparatus further comprises:

a cabinet for accommodating the disc reproducing unit and the controller, and further, wherein, the input unit is arranged on the top surface of the cabinet and the display unit is provided on the cabinet.

4. The electronic dictionary apparatus of claim 3, wherein the display unit is rotationally mounted on the cabinet.

5. An electronic dictionary apparatus as in claim 1, wherein the controller keeps a search state of a search file currently searched while executing a search of another file or item and displays the two search results simultaneously on the display.

6. An electronic dictionary apparatus as in claim 1, wherein the results of the first search are automatically restored on the display when the second search is completed.

7. An electronic dictionary apparatus as in claim 1, wherein the results of the first search are restored on the display without additional user inputs when the second search is completed.

8. A method for searching a plurality of dictionary data recorded on an optical disc, comprising the steps of:

determining whether an optical disc is one on which is recorded a plurality of dictionary data;

searching a first one of the plurality of dictionary data recorded on the optical disc based on a first inputted search term;

displaying the results of the search using the first search term;

generating display window data for a second inputted search term for searching a second one of the plurality of dictionary data;

displaying the generated window data for the second inputted search term;

searching the second one of the plurality of dictionary data recorded on the optical disc based on the second search term displayed in the window;

storing the first inputted search term;

displaying the results of the search using the second search term; and automatically reading out the stored first input search term, searching the first one of the plurality of dictionary data recorded on the optical disc based on the first inputted search term, and displaying the results of the search using the first search term in response to termination of the search using the second search term.

9. The method of claim 8, further comprising the step of automatically restoring the results of the first search on the display when the second search is completed.

10. The method of claim 8, further comprising the step of restoring the results of the first search on the display without additional user inputs when the second search is completed.

* * * * *